US012441571B2

United States Patent
(12) United States Patent
Iida et al.

(10) Patent No.: US 12,441,571 B2
(45) Date of Patent: Oct. 14, 2025

(54) PAPER SHEET HANDLING APPARATUS

(71) Applicants: FUJITSU FRONTECH LIMITED, Tokyo (JP); FUJITSU FRONTECH SYSTEMS LIMITED, Maebashi (JP)

(72) Inventors: Naoya Iida, Inagi (JP); Tomohiro Yamada, Inagi (JP); Hiroshi Miyazaki, Inagi (JP); Hisao Izumi, Inagi (JP); Nobuhiko Ishii, Inagi (JP)

(73) Assignees: FUJITSU FRONTECH LIMITED, Tokyo (JP); FUITSU FRONTECH SYSTEMS LIMITED, Maebashi (JP)

( * ) Notice: Subject to any disclaimer, the term of this patent is extended or adjusted under 35 U.S.C. 154(b) by 162 days.

(21) Appl. No.: 18/357,454

(22) Filed: Jul. 24, 2023

(65) Prior Publication Data

US 2023/0365370 A1 Nov. 16, 2023

Related U.S. Application Data

(63) Continuation of application No. PCT/JP2021/006005, filed on Feb. 17, 2021.

(51) Int. Cl.
*B65H 31/26* (2006.01)
*G07D 11/14* (2019.01)

(52) U.S. Cl.
CPC ............. *B65H 31/26* (2013.01); *G07D 11/14* (2019.01); *B65H 2301/42142* (2013.01); *B65H 2301/4223* (2013.01); *B65H 2404/1521* (2013.01); *B65H 2404/64* (2013.01); *B65H 2701/1912* (2013.01)

(58) Field of Classification Search
CPC ............ B65H 31/26; B65H 2301/4223; B65H 2404/64
See application file for complete search history.

(56) References Cited

U.S. PATENT DOCUMENTS

| | | | |
|---|---|---|---|
| 7,708,192 | B2 | 5/2010 | Yokoi et al. |
| 2003/0137095 | A1 | 7/2003 | Ito et al. |

FOREIGN PATENT DOCUMENTS

| | | | |
|---|---|---|---|
| JP | 59011484 | A | 1/1984 |
| JP | 2006053811 | A | 2/2006 |
| JP | 2007004554 | A | 1/2007 |
| JP | 2010257090 | A | 11/2010 |
| JP | 4889456 | B2 | 3/2012 |
| JP | 2014238785 | A | 12/2014 |
| JP | 2018116339 | A | 7/2018 |

OTHER PUBLICATIONS

ISR issued in PCT/JP2021/006005, mailed May 18, 2021.
Written Opinion of the ISR issued in PCT/JP2021/006005, dated May 18, 2021.
Office action issued in corresponding Japanese patent application No. 2023-500199, dated Aug. 29, 2023.
Search Report issued in corresponding European patent application No. EP21 926 519.6, dated Mar. 4, 2024.

*Primary Examiner* — Jeremy R Severson
(74) *Attorney, Agent, or Firm* — Greer Burns & Crain Ltd.

(57) ABSTRACT

A paper sheet handling apparatus includes a movable unit that changes a size of a taking-out space by moving in a direction of approaching a paper sheet discharged to the taking-out space and a direction of retreating the paper sheet, in which the movable unit includes a movable unit main body and a pressing unit movable to a storage position where the pressing unit is moved along the movable unit main body and a pressing position where the pressing unit presses the paper sheet.

4 Claims, 22 Drawing Sheets

PAPER SHEET HANDLING APPARATUS

CROSS-REFERENCE TO RELATED APPLICATION

This application is continuation application of International Application PCT/JP2021/006005 filed on Feb. 17, 2021 and designated the U.S., the entire contents of which are incorporated herein by reference.

FIELD

The embodiments discussed herein are related to a paper sheet handling apparatus.

BACKGROUND

Conventionally, there has been proposed a deposit/withdrawal device that conveys a banknote in a state where the banknote is nipped so as to protrude from a deposit/withdrawal port when the banknote is withdrawn.

Related Art Documents: Japanese Patent No. 4889456, and JP 59-11484 A

SUMMARY

A paper sheet handling apparatus of the disclosure includes a movable unit that changes a size of a taking-out space by moving in a direction of approaching a paper sheet discharged to the taking-out space and a direction of retreating the paper sheet, in which the movable unit includes a movable unit main body and a pressing unit movable to a storage position at which the pressing unit is stored along the movable unit main body, and a pressing position at which the pressing unit presses the paper sheet.

The object and advantages of the present invention will be realized by the elements set forth in the claims or combinations thereof.

DESCRIPTION OF EMBODIMENTS

By the way, in a case where an automatic transaction apparatus such an automated teller machine (ATM) or the like is particularly arranged outdoors, when a withdrawal port is opened, a banknote to be withdrawn is in a free state in a taking-out space, which causes a problem that the banknote is blown away by wind or the like.

As described above, in the deposit/withdrawal device that conveys the banknote while nipping the banknote and causes the banknote to protrude from the withdrawal port, the problem that the banknote is blown away is unlikely to occur. However, in a state where the banknote is nipped by a conveying belt, a conveying roller, or the like, it is difficult for a customer to remove the banknote, and the banknote may be damaged.

Hereinafter, a paper sheet handling apparatus according to an embodiment of the present invention will be described with reference to the drawings using an automatic transaction apparatus 100 as an example.

Figure 1:
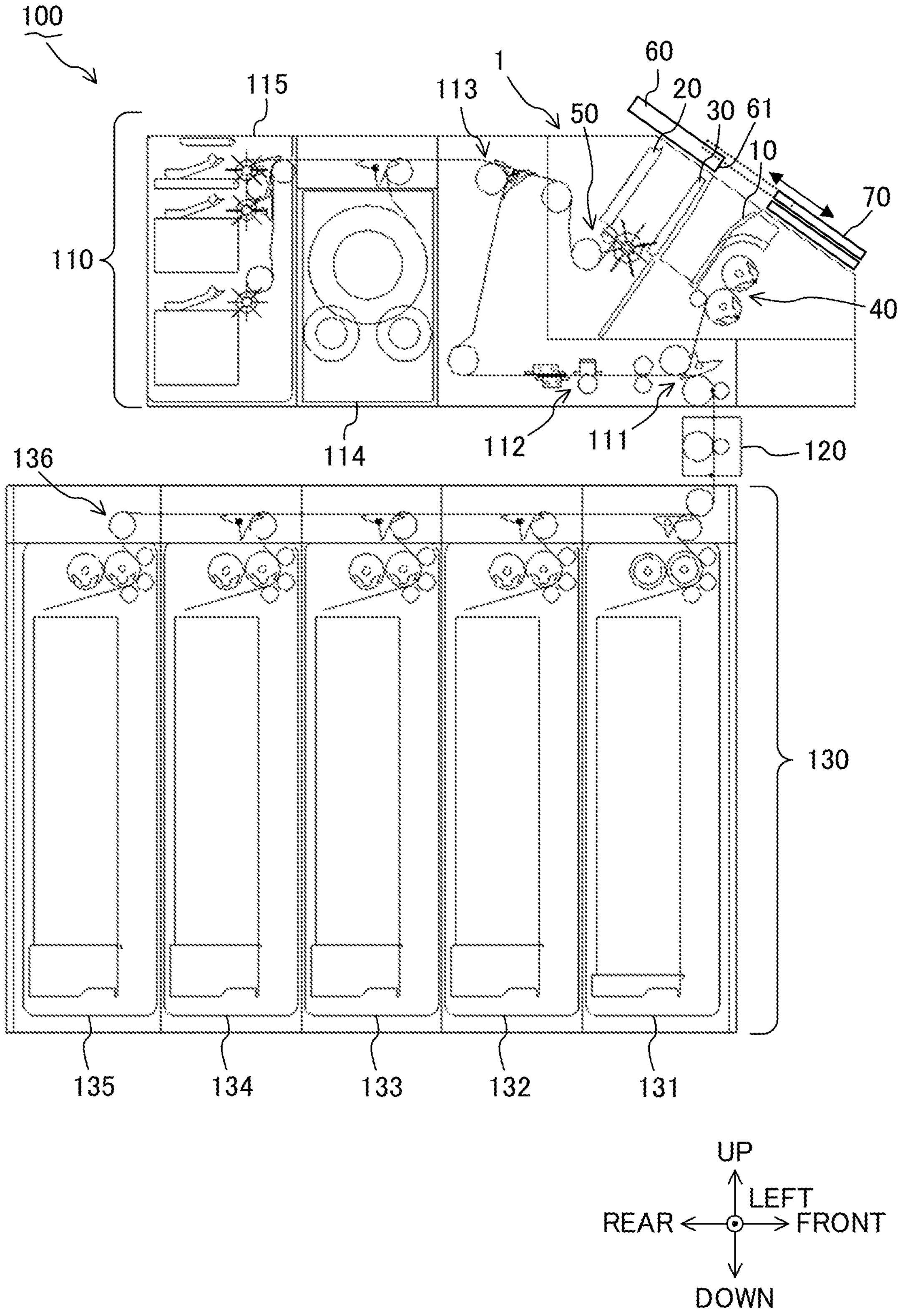
FIG. 1 is a left side view illustrating an internal structure of an automatic transaction apparatus in an embodiment.

FIG. 1 is a left side view illustrating an internal structure of the automatic transaction apparatus 100.

Note that the up and down, front and back, and left-right directions illustrated in FIG. 1 and FIGS. 2A to 2C, FIG. 3, FIGS. 11A to 11D, and FIGS. 12A to 12D to be described later are merely an example of a case where a customer side of the automatic transaction apparatus 100 is the front direction, but for example, the up-down direction is a vertical direction, and the front-back direction and the left-right direction are horizontal directions.

The automatic transaction apparatus 100 illustrated in FIG. 1 is, for example, an ATM, a bill recycle unit (BRU), a cash dispenser (CD), a teller cash recycler (TCR), or the like, and includes a main body unit 110, an intermediate conveying unit 120, and a storage unit 130. As an example, the main body unit 110 and the storage unit 130 are arranged in different spaces via a partition (not illustrated) interposed therebetween, and the intermediate conveying unit 120 conveys a banknote B (see FIG. 2A) so as to penetrate the partition. Note that the banknote B is an example of a paper sheet.

The main body unit 110 includes a banknote deposit/withdrawal unit 1, conveying units 111 and 113, a distinguishing unit 112, a temporarily holding unit 114, and a reject unit 115.

Figure 3:
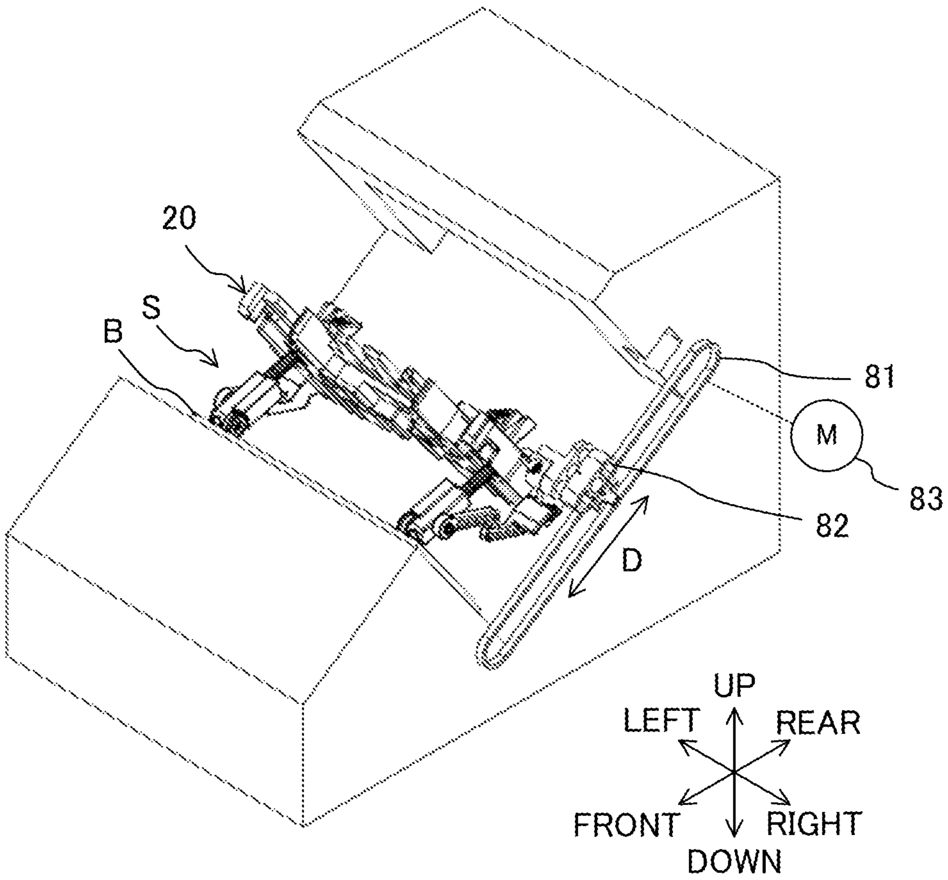
FIG. 3 is a perspective view for explaining movement of a roof in an approaching/retreating direction with respect to a banknote in the embodiment.

The banknote deposit/withdrawal unit 1 includes a stage 10, a roof 20 as an example of a movable unit, a pusher 30, a taking-in and conveying unit 40, a discharge conveying unit 50, a front panel 60, a shutter 70, a timing belt 81, a coupling member 82, and a belt drive motor 83 illustrated in FIG. 3. Note that only the banknote deposit/withdrawal unit 1 can be regarded as an example of the paper sheet handling apparatus.

Although the roof 20 of the banknote deposit/withdrawal unit 1 will be described later, the stage 10, the roof 20, and the pusher 30 have a rectangular plate shape and are arranged in parallel to each other.

The taking-in and conveying unit 40 conveys the banknote B inserted between the stage 10 and the pusher 30 to take the banknote B into the automatic transaction apparatus 100.

The discharge conveying unit 50 discharges the banknote B between the roof 20 and the pusher 30.

On an upper front surface of the automatic transaction apparatus 100, the front panel 60 is disposed to be inclined with respect to the vertical direction and the horizontal direction so as to be located rearward as going upward. The front panel 60 is provided with an insertion/taking-out port 61.

The shutter 70 openably closes the insertion/taking-out port 61. Note that, in FIG. 1, the shutter 70 in an opened state is illustrated by a solid line, and the shutter 70 in a closed state is illustrated by a dotted line.

The conveying unit 111 conveys the banknote B from the banknote deposit/withdrawal unit 1 to the distinguishing unit 112, and conveys the banknote B between the distinguishing unit 112 and the intermediate conveying unit 120.

The distinguishing unit 112 determines authenticity, contamination, corner breakage, and the like of the banknote B.

The conveying unit 113 conveys the banknote B between the distinguishing unit 112 and the temporarily holding unit 114, and conveys the banknote B from the distinguishing unit 112 to the banknote deposit/withdrawal unit 1.

The temporarily holding unit 114 temporarily stores the banknote B that is inserted into the banknote deposit/withdrawal unit 1 and determined to be normal in the distinguishing unit 112.

The reject unit 115 stores a banknote B, which is not to be returned, among such banknotes B determined to be abnormal in the distinguishing unit 112.

The intermediate conveying unit 120 conveys the banknote B between the main body unit 110 and the storage unit 130.

The storage unit 130 is disposed below the main body unit 110, and includes a plurality of banknote storage cassettes 131, 132, 133, 134, and 135, and a storage conveying unit 136.

The plurality of banknote storage cassettes 131 to 135 store, for example, such banknotes B of which money types are different from one another. The banknote storage cassettes 131 to 135 can eject the stored banknotes B. Therefore, the banknotes B stored in the banknote storage cassettes 131 are 135 are used for withdrawal.

The storage conveying unit 136 conveys the banknotes B between the intermediate conveying unit 120 and the respective banknote storage cassettes 131 to 135.

Figure 2A:
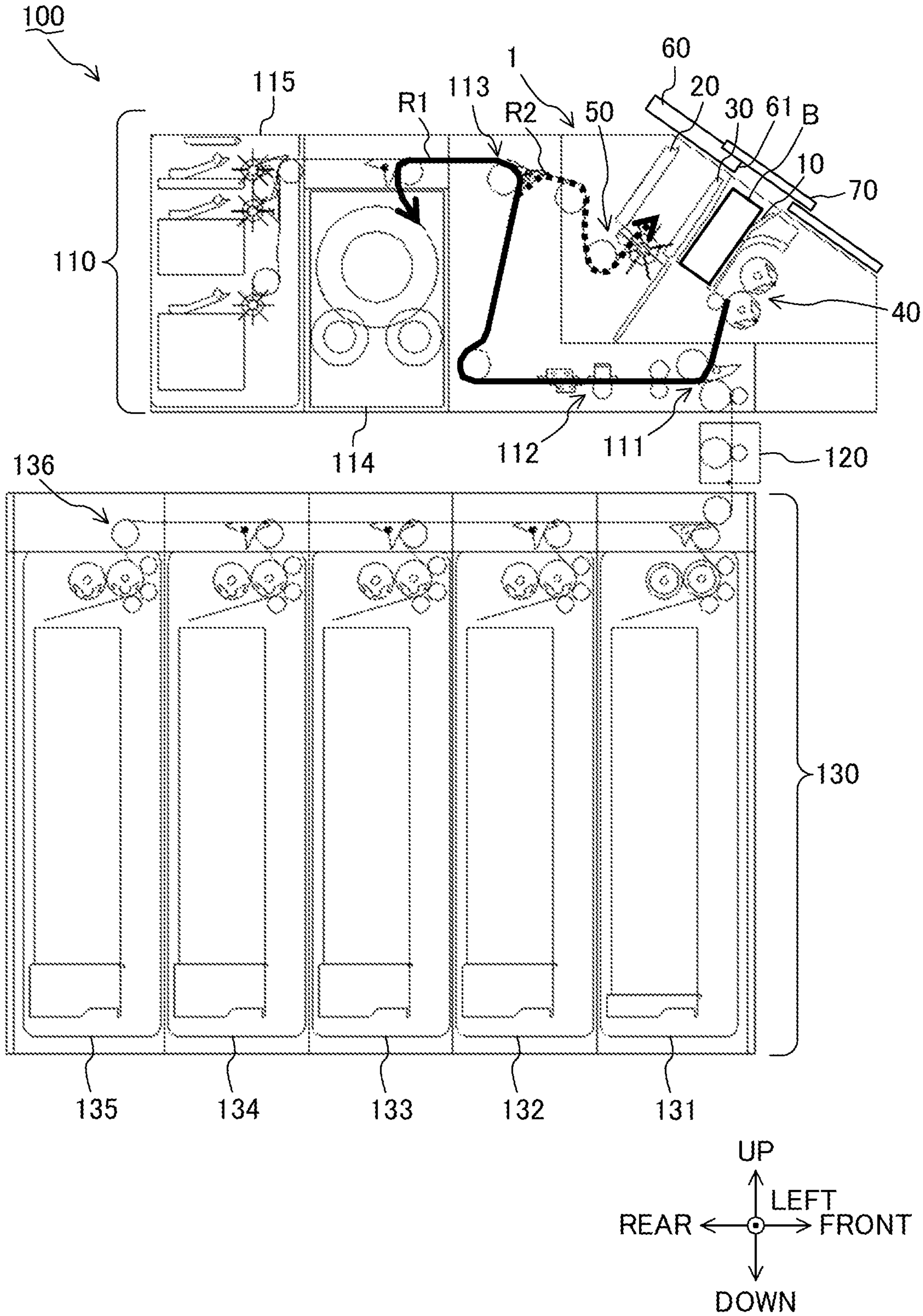
FIG. 2A is an explanatory diagram (1) for explaining a conveyance route of a banknote of the automatic transaction apparatus in the embodiment.
Figure 2B:
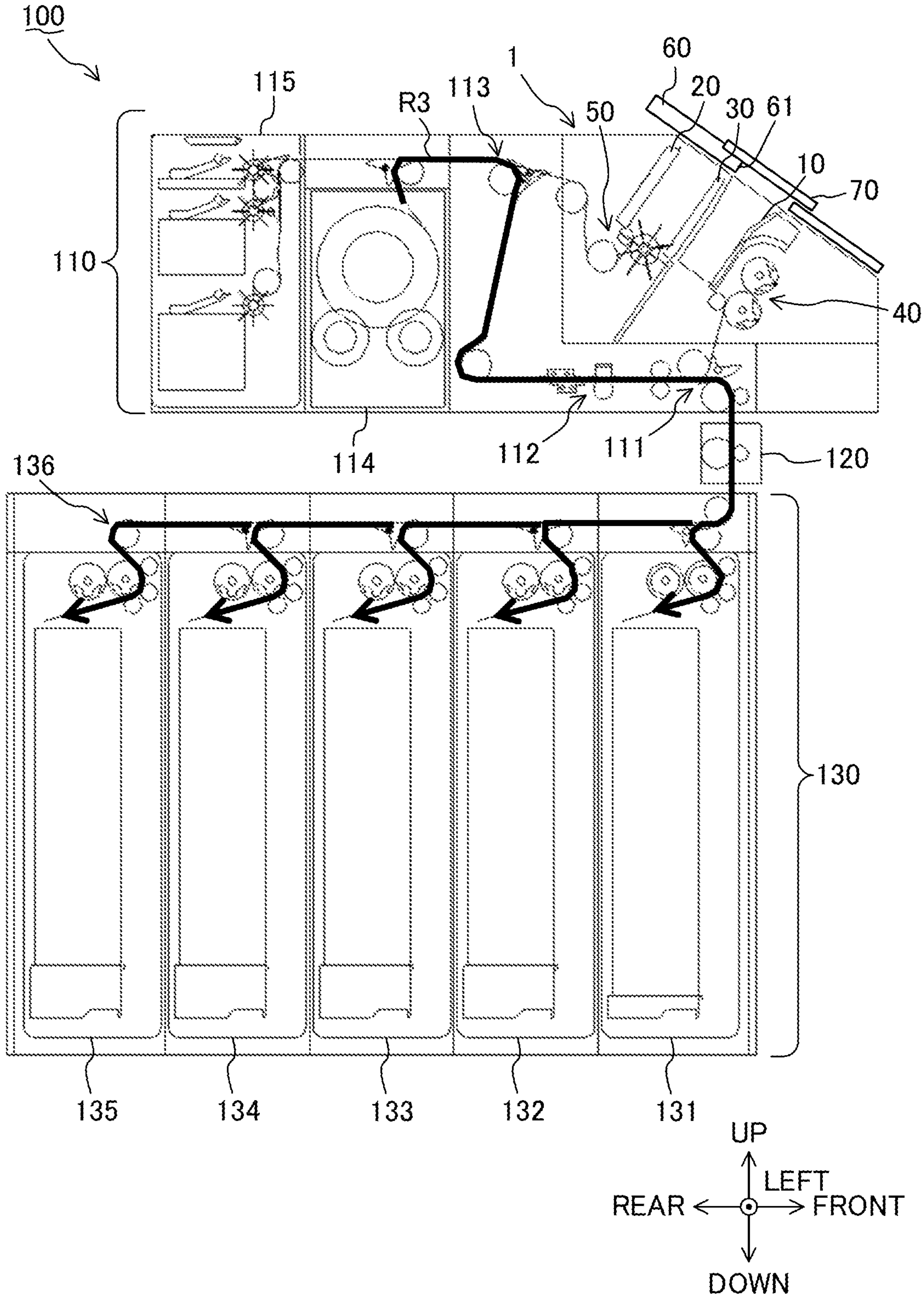
FIG. 2B is an explanatory diagram (2) for explaining a conveyance route of a banknote of the automatic transaction apparatus in the embodiment.
Figure 2C:
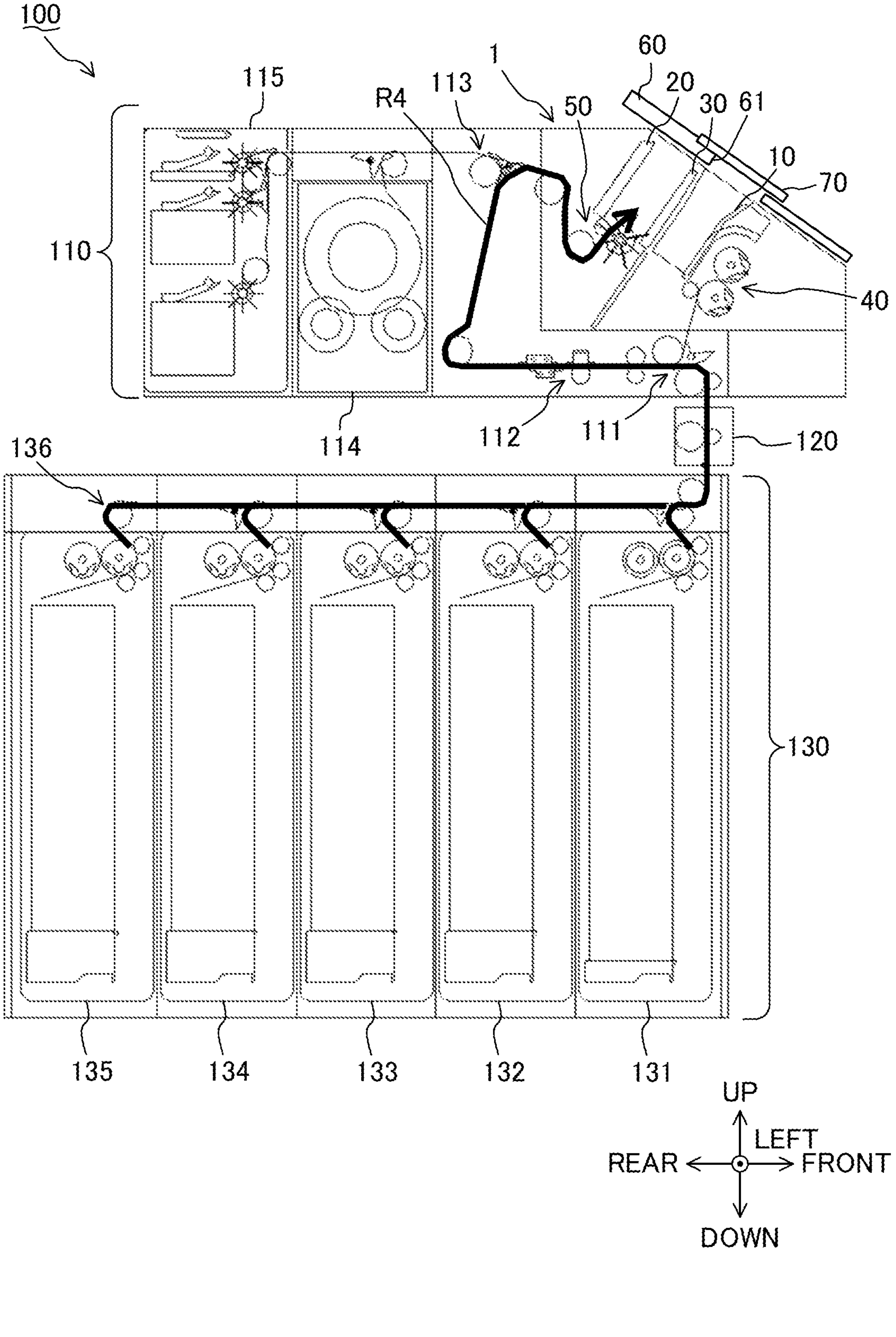
FIG. 2C is an explanatory diagram (3) for explaining a conveyance route of a banknote of the automatic transaction apparatus in the embodiment.

FIGS. 2A to 2C are explanatory views for explaining conveyance routes R1 to R4 of the automatic transaction apparatus 100 for the banknotes B.

First, as in the conveyance route R1 indicated by a thick solid arrow in FIG. 2A, the banknote B inserted into the banknote deposit/withdrawal unit 1 is conveyed to the distinguishing unit 112 by the taking-in and conveying unit 40 and the conveying unit 111. Further, the banknote B determined to be normal in the distinguishing unit 112 is conveyed to the temporarily holding unit 114 by the conveying unit 113.

Meanwhile, as in the conveyance route R2 indicated by a thick dotted arrow in FIG. 2A, the banknote B (counterfeit banknote and the like) determined to be abnormal in the distinguishing unit 112 is returned to the banknote deposit/withdrawal unit 1 by the conveying unit 113 and the discharge conveying unit 50.

As in the conveyance route R3 indicated by a thick solid arrow in FIG. 2B, the banknotes B temporarily stored in the temporarily holding unit 114 are conveyed to the respective banknote storage cassettes 131 to 135 by the conveying unit 113, the distinguishing unit 112, the conveying unit 111, the intermediate conveying unit 120, and the storage conveying unit 136.

As in the conveyance route R4 indicated by a thick solid arrow in FIG. 2C, the banknotes B stored in the respective banknote storage cassettes 131 to 135 are discharged, at the time of withdrawal, to the banknote deposit/withdrawal unit 1 by the storage conveying unit 136, the intermediate conveying unit 120, the conveying unit 111, the distinguishing unit 112, the conveying unit 113, and the discharge conveying unit 50.

Next, a configuration of the roof 20 will be described.

FIG. 3 is a perspective view for explaining the movement of the roof 20 in the approaching/retreating direction D with respect to the banknote B.

Figure 4:
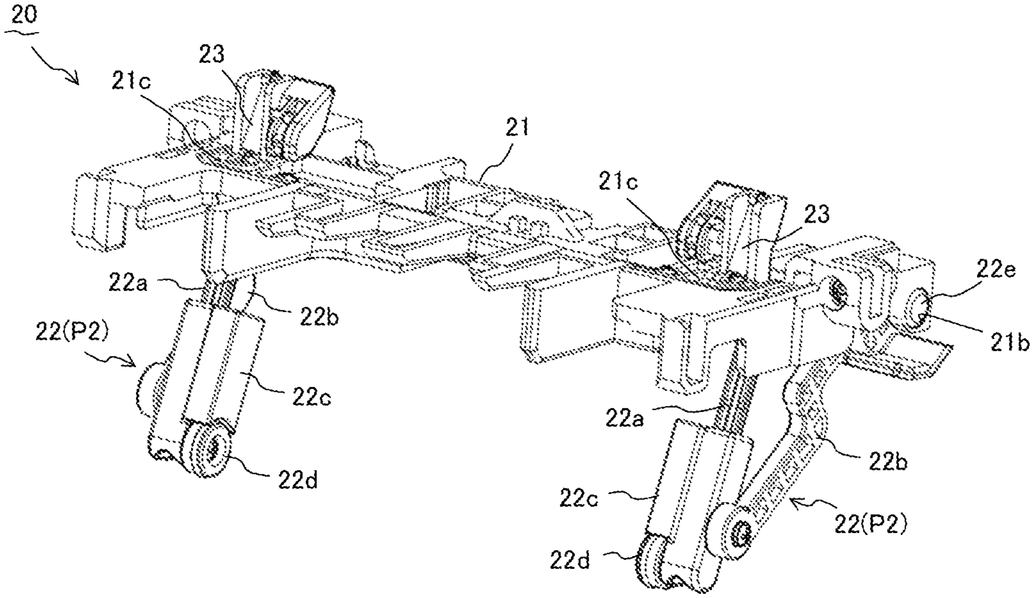
FIG. 4 is a perspective view (1) illustrating a roof in which a pressing unit is at a pressing position in the embodiment.
Figure 5:
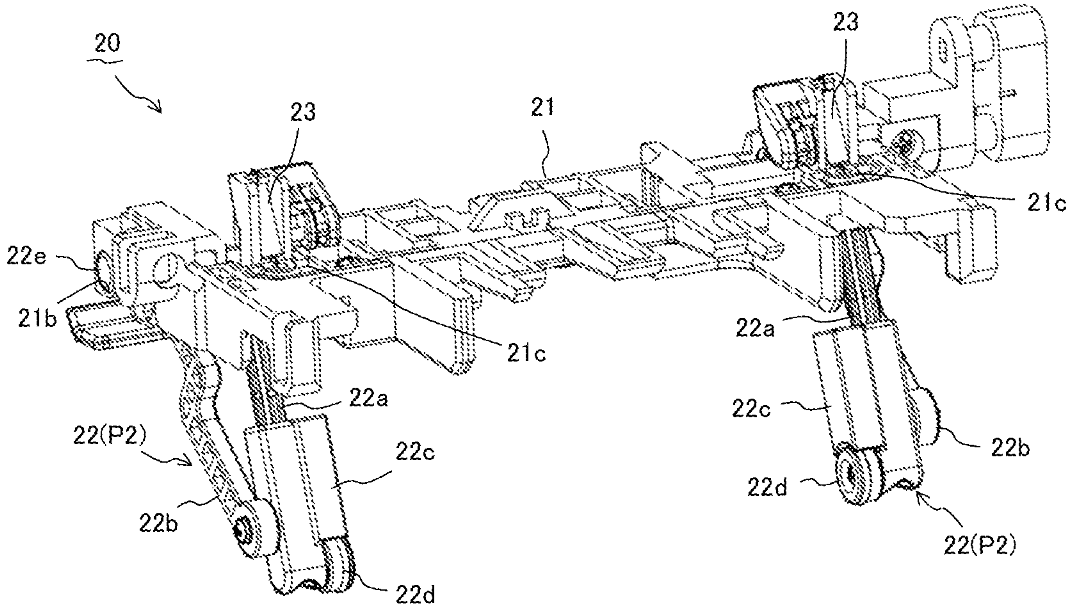
FIG. 5 is a perspective view (2) illustrating the roof in which the pressing unit is at the pressing position in the embodiment.
Figure 6:
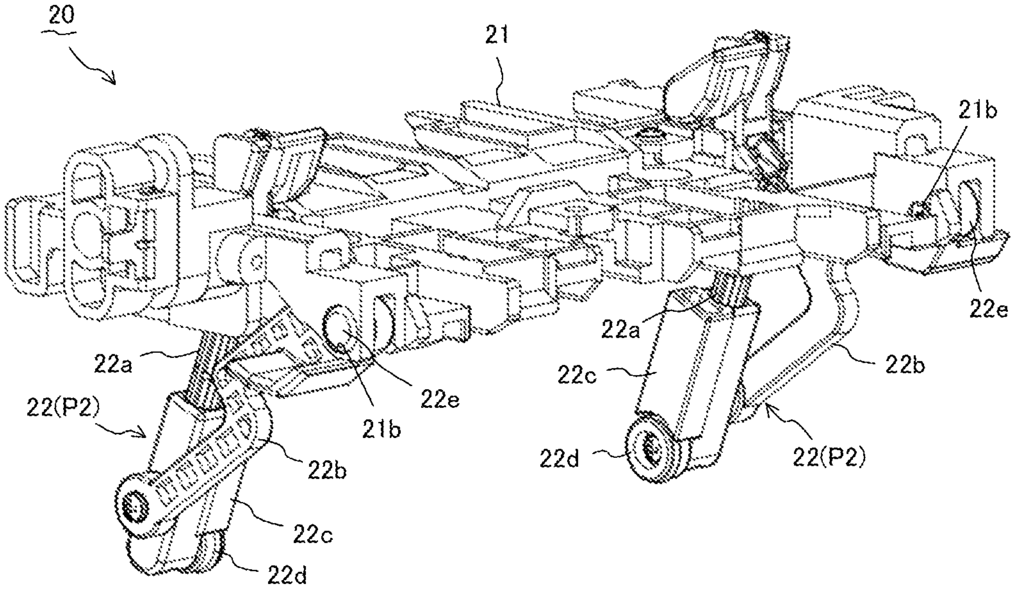
FIG. 6 is a perspective view (3) illustrating the roof in which the pressing unit is at the pressing position in the embodiment.

FIGS. 4 to 6 are perspective views illustrating the roof 20 in which a roof main body 21 is at the pressing position P2.

Figure 7:
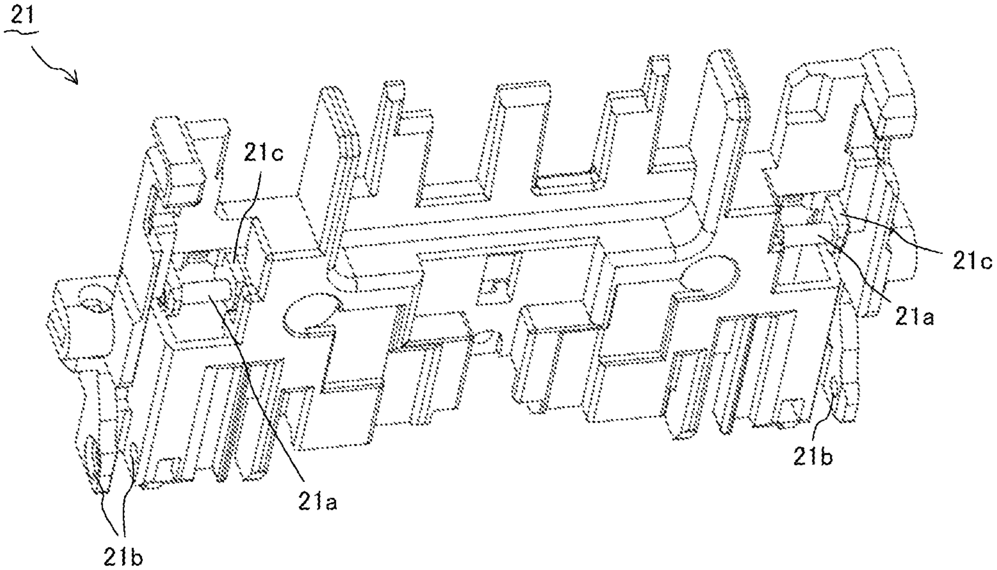
FIG. 7 is a perspective view illustrating a roof main body in the embodiment.

FIG. 7 is a perspective view illustrating the roof main body 21.

Figure 8:
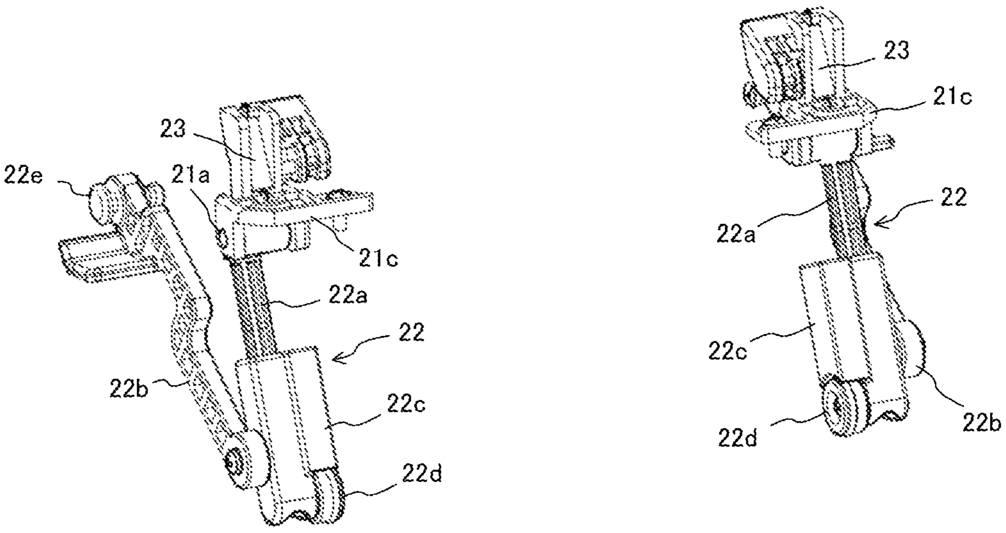
FIG. 8 is a perspective view illustrating the pressing unit and a tension spring in the embodiment.

FIG. 8 is a perspective view illustrating pressing units 22 and tension springs 23.

Figure 9A:
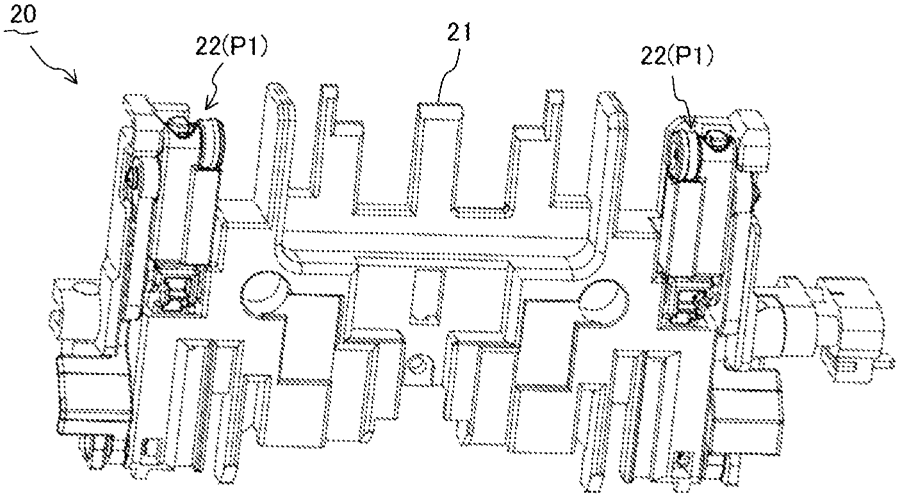
FIG. 9A is a perspective view illustrating the roof for explaining movement (storage position) of the pressing unit in the embodiment.

FIG. 9A is a perspective view illustrating the roof 20 for explaining a movement (storage position P1) of the pressing units 22.

Figure 9B:
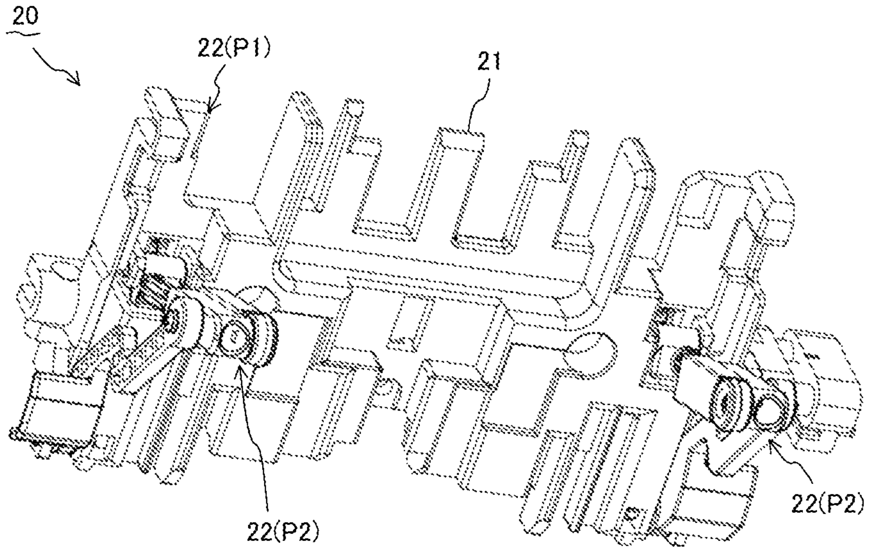
FIG. 9B is a perspective view illustrating the roof for explaining movement (pressing position) of the pressing unit in the embodiment.

FIG. 9B is a perspective view illustrating the roof 20 for explaining the movement (pressing position P2) of the pressing units 22.

Figure 10A:
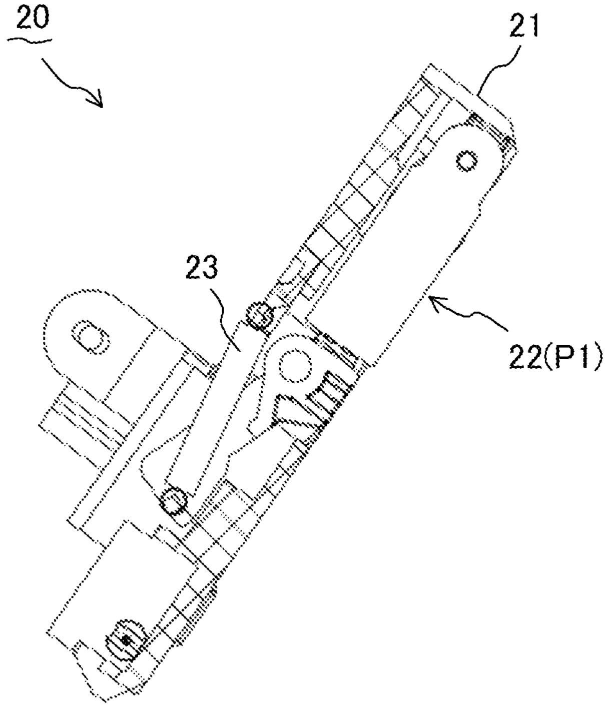
FIG. 10A is a cross-sectional view illustrating the roof for explaining movement (storage position) of the pressing unit in the embodiment.

FIG. 10A is a sectional view illustrating the roof 20 for explaining the movement (storage position P1) of the pressing units 22.

Figure 10B:
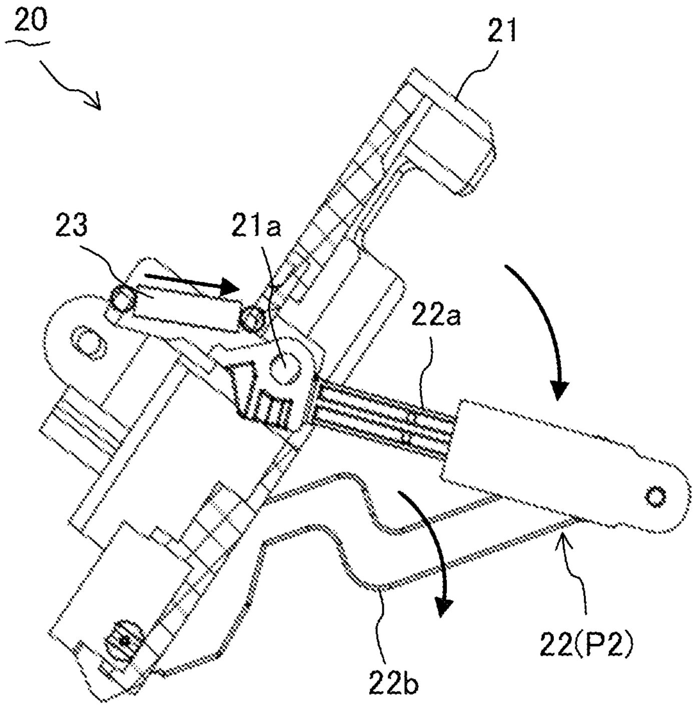
FIG. 10B is a cross-sectional view illustrating the roof for explaining movement (pressing position) of the pressing unit in the embodiment.

FIG. 10B is a sectional view illustrating the roof 20 for explaining the movement (pressing position P2) of the pressing units 22.

The roof 20 illustrated in FIG. 3 is coupled to the coupling member 82 fixed to the endless belt-shaped timing belt 81. When the belt drive motor 83, which is an example of an actuator, rotates the timing belt 81 via a drive transmission mechanism (not illustrated), the roof 20 coupled to the coupling member 82 moves in a direction of approaching and retreating the banknote B discharged to the taking-out space S (approaching/retreating direction D). The roof 20 changes the size of the taking-out space S by moving in the approaching/retreating direction D in this manner. In the example illustrated in FIG. 1, for example, the roof 20 forms the taking-out space S with the pusher 30.

As illustrated in FIGS. 4 to 6, the roof 20 includes the roof main body 21, the two pressing units 22 provided in a pair on the left and right, and the tension springs 23 provided on the respective pressing units 22.

As illustrated in FIG. 7, the roof main body 21 is provided with grooves, holes, and irregularities, but has a rectangular plate shape as a whole. The roof main body 21 includes two first rotation shafts 21*a*, second rotation shaft holes 21*b* provided at two portions, and two spring fixing members 21*c*. Note that the roof main body 21 is an example of a movable unit main body.

The first rotation shaft 21*a* is a rotation center of a first lever 22*a* described later of the pressing unit 22 illustrated in FIGS. 4 to 6.

Each of the second rotation shaft holes 21*b* provided at two portions includes two holes into which a second rotation shaft 22*e* to be described later of the pressing unit 22 illustrated in FIGS. 4 to 6 is inserted.

The two spring fixing members 21*c* are fixed to the roof main body 21 as separate members, for example. The spring fixing member 21*c* is provided with the above-described first rotation shaft 21*a*. One end of the tension spring 23 is fixed to the spring fixing member 21*c*.

The two pressing units 22 are movable to the storage position P1 (see FIGS. 9A and 10A) at which the pressing unit 22 is stored along the roof main body 21 and the pressing position P2 (see FIGS. 9B and 10B) at which the pressing unit 22 presses the banknote B.

As illustrated in FIG. 8, each of the two pressing units 22 includes a first lever 22*a*, a second lever 22*b*, a slider 22*c*, a roller 22*d*, and a second rotation shaft 22*e*.

The first lever 22*a* is rotatably supported by the roof main body 21 on the first rotation shaft 21*a*. In addition, the distal end of the first lever 22*a* on the banknote B (roller 22*d*) side at the storage position P1 illustrated in FIGS. 9A and 10A is stored outside the taking-out space S illustrated in FIG. 3 with respect to the first rotation shaft 21*a*.

One end of the second lever 22*b* is rotatably supported by the roof main body 21 on the second rotation shaft 22*e* located on the inner side of the taking-out space S with respect to the first rotation shaft 21*a* in the roof main body 21.

The slider 22*c* slides along the first lever 22*a* with a distal end, which is the other end of the second lever 22*b*, fixed. Therefore, the slider 22*c* is provided with an insertion hole into which the first lever 22*a* is inserted.

The roller 22*d* is rotatably fixed to the slider 22*c* and abuts on the banknote B.

The second rotation shaft 22*e* is provided at the one end of the second lever 22*b* opposite to the slider 22*c*, and is inserted into the second rotation shaft hole 21*b* of the roof main body 21 as described above.

As described above, one end of the tension spring 23 is fixed to the spring fixing member 21*c*, and the other end is fixed to one end of the first lever 22*a* on the side opposite to the banknote B (roller 22*d*). As illustrated in FIG. 10B, when the tension spring 23 pulls the first lever 22*a*, the first lever 22*a* rotates clockwise in FIG. 10B about the first rotation shaft 21*a*, and accordingly, the second lever 22*b* rotates clockwise in FIG. 10B about the second rotation shaft 22*e*. As a result, the pressing unit 22 moves to the pressing position P2.

The tension spring 23 is an example of a biasing member that biases the pressing unit 22 toward the pressing position P2. As the biasing member, another elastic body such as a torsion spring may be used.

Next, operation of the roof 20 will be described.

FIGS. 11A to 11D are left side views illustrating the internal structure around the taking-out space S for explaining the operation of the roof 20.

FIGS. 12A to 12D are cross-sectional views illustrating the internal structure around the taking-out space S for explaining the operation of the roof 20.

Figure 11A:
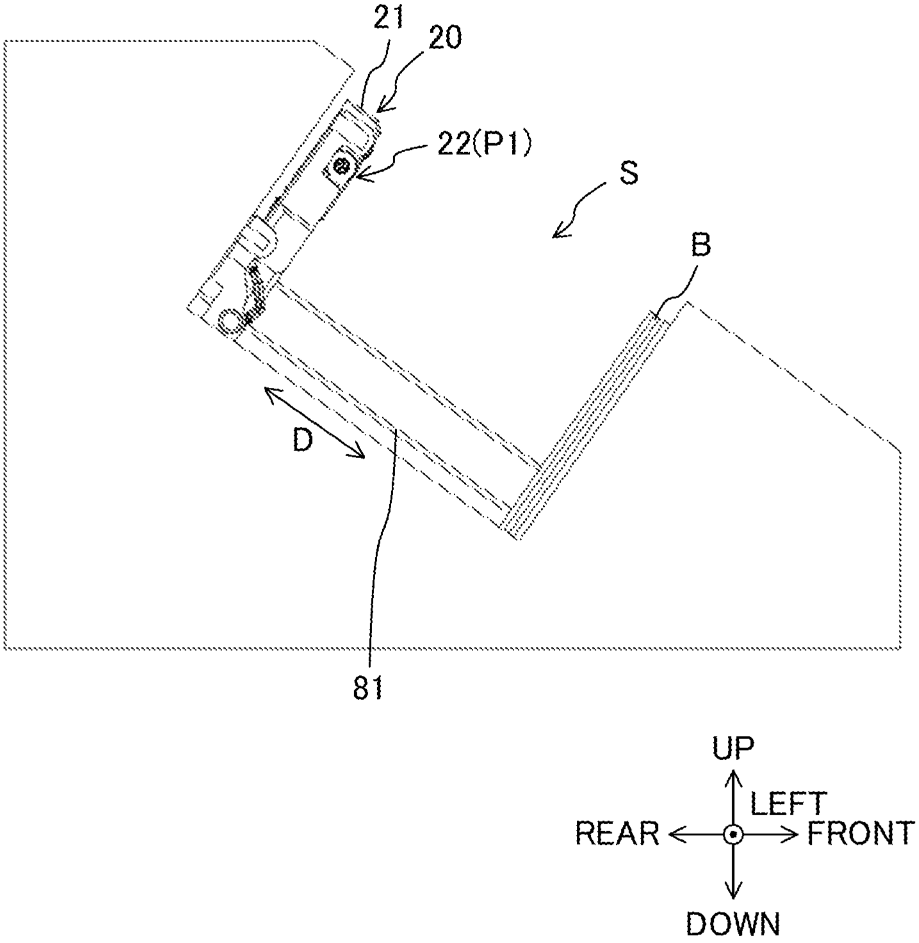
FIG. 11A is a left side view (1) illustrating an internal structure around a taking-out space for explaining operation of the roof in the embodiment.
Figure 12A:
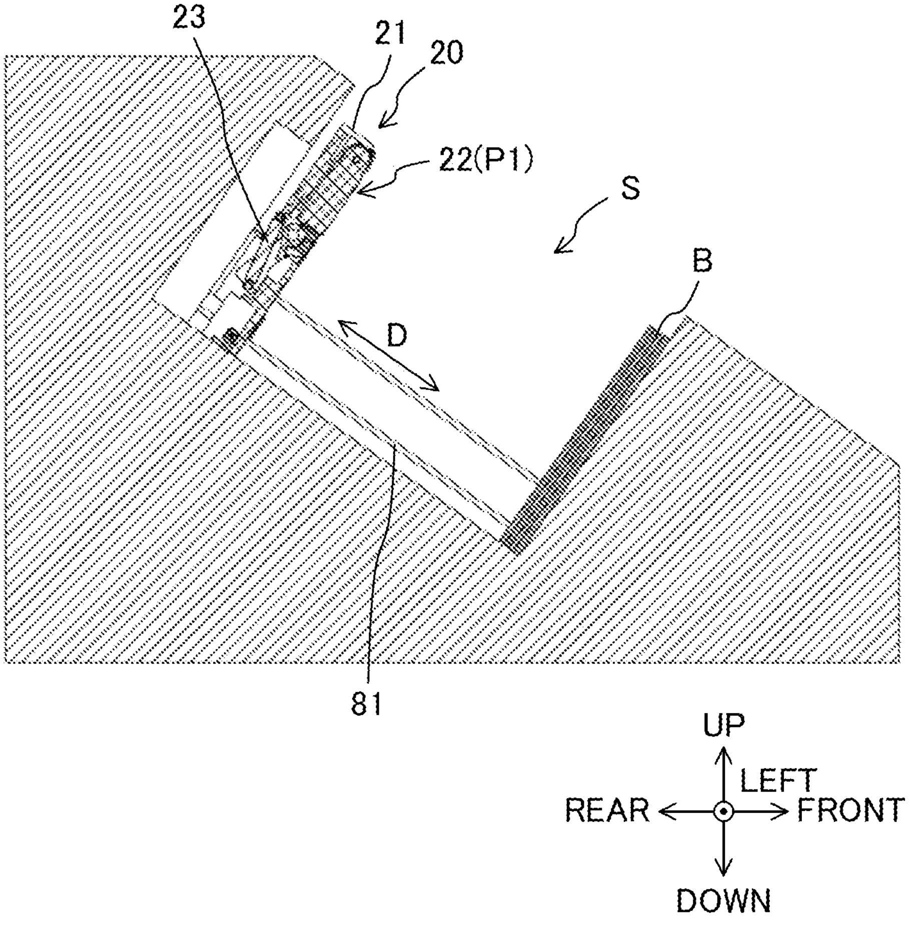
FIG. 12A is a cross-sectional view (1) illustrating the internal structure around the taking-out space for explaining the operation of the roof in the embodiment.

As illustrated in FIGS. 11A and 12A, in a state where the roof 20 is retreated from the banknote B, the pressing unit 22 is stored at the storage position P1 against the biasing force of the tension spring 23, for example, by being in contact with a contact member (not illustrated) and pressed by the first lever 22*a*. In this state, the banknote B for withdrawal is conveyed to the taking-out space S by the discharge conveying unit 50 and the like illustrated in FIG. 1 described above.

Figure 11B:
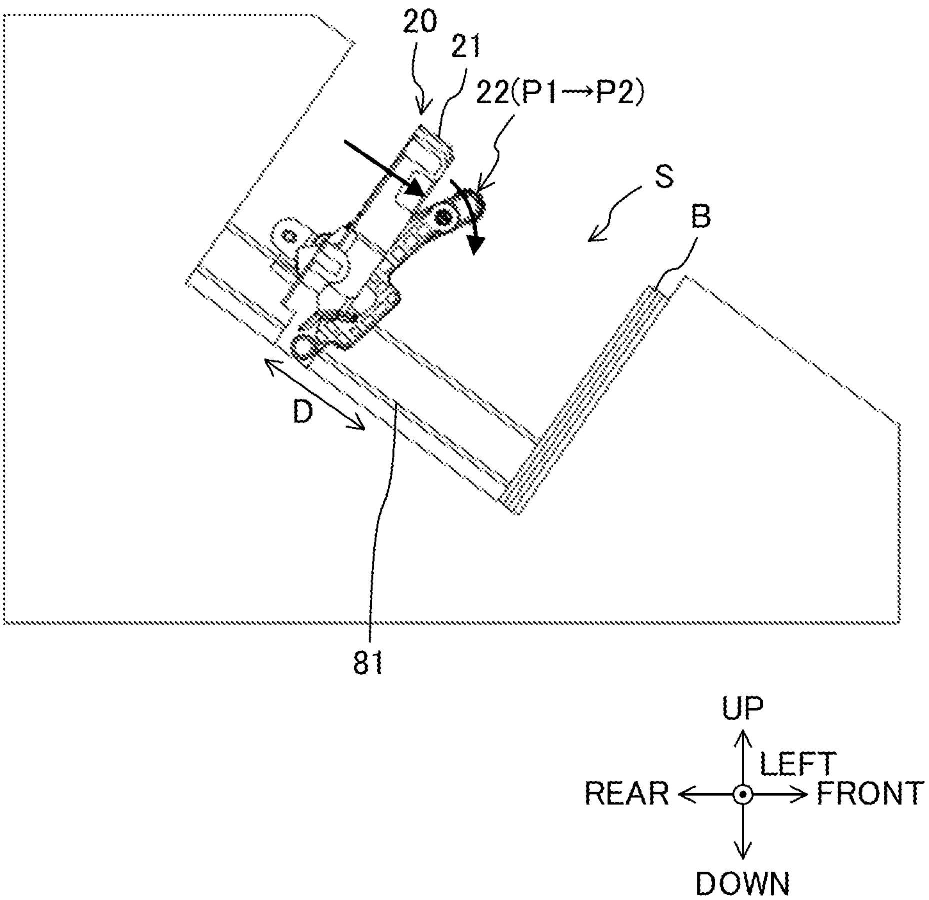
FIG. 11B is a left side view (2) illustrating the internal structure around the taking-out space for explaining the operation of the roof in the embodiment.
Figure 12B:
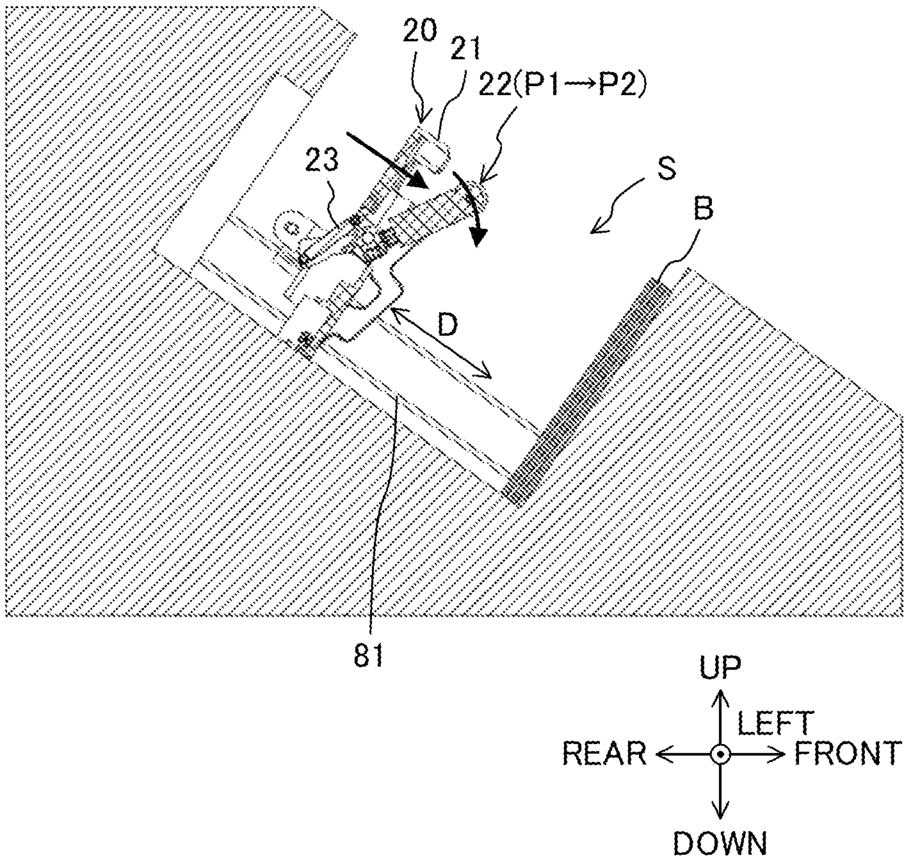
FIG. 12B is a cross-sectional view (2) illustrating the internal structure around the taking-out space for explaining the operation of the roof in the embodiment.

As illustrated in FIGS. 11B and 12B, before the taking-out space S is opened to the customer, the timing belt 81 is rotated by the driving of the belt drive motor 83 illustrated in FIG. 3 described above, and the roof 20 coupled to the coupling member 82 together with the coupling member 82 fixed to the timing belt 81 starts to move in the direction of approaching the banknote B in the approaching/retreating direction D. In the pressing unit 22, the contact with the contact member (not illustrated) is released, and the first lever 22*a* and the second lever 22*b* rotate and move toward the pressing position P1 by the biasing force of the tension spring 23 (position P1-P2). Note that the roof 20 preferably has a larger amount of movement in the direction approaching the banknote B in the approaching/retreating direction D such that the smaller the number of the banknotes B discharged to the taking-out space S, the narrower the taking-out space S.

Figure 11C:
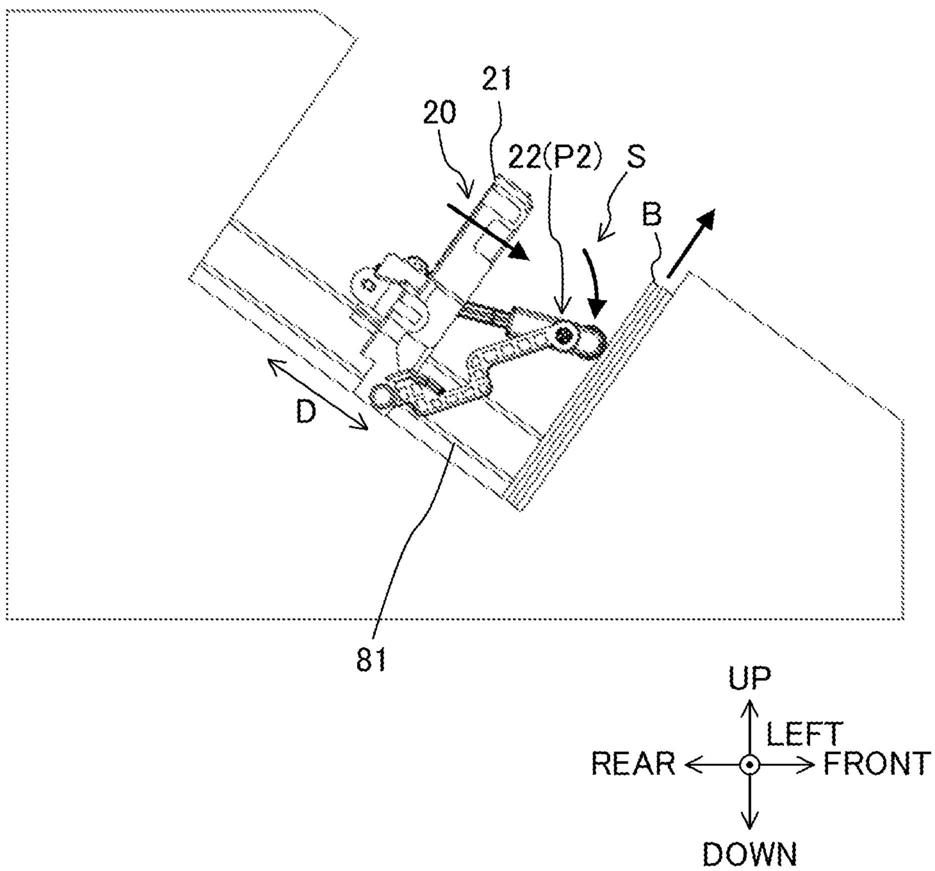
FIG. 11C is a left side view (3) illustrating the internal structure around the taking-out space for explaining the operation of the roof in the embodiment.
Figure 12C:
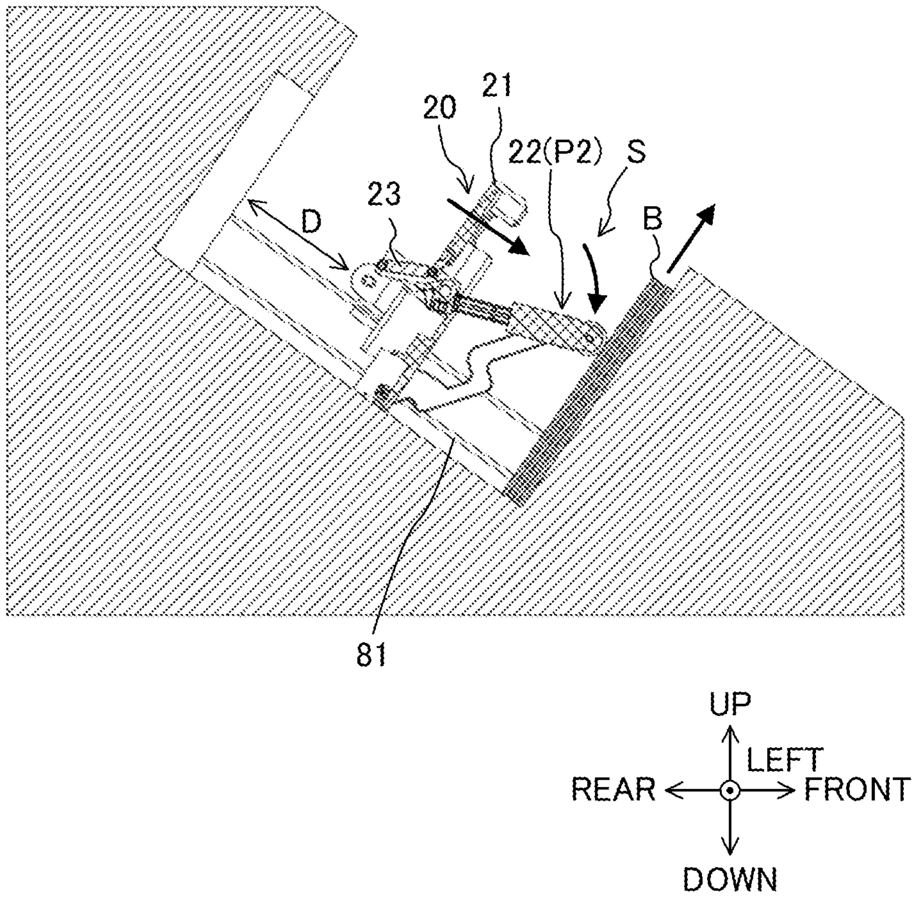
FIG. 12C is a cross-sectional view (3) illustrating the internal structure around the taking-out space for explaining the operation of the roof in the embodiment.

As illustrated in FIGS. 11C and 12C, when the movement of the roof 20 ends, the pressing unit 22 abuts on the banknote B in the roller 22*d* by the biasing force of the tension spring 23 and remains at the pressing position P2. In this state, the customer of the automatic transaction apparatus 100 can easily take out the banknote B pressed only by the biasing force of the tension spring 23 from the taking-out space S.

Figure 11D:
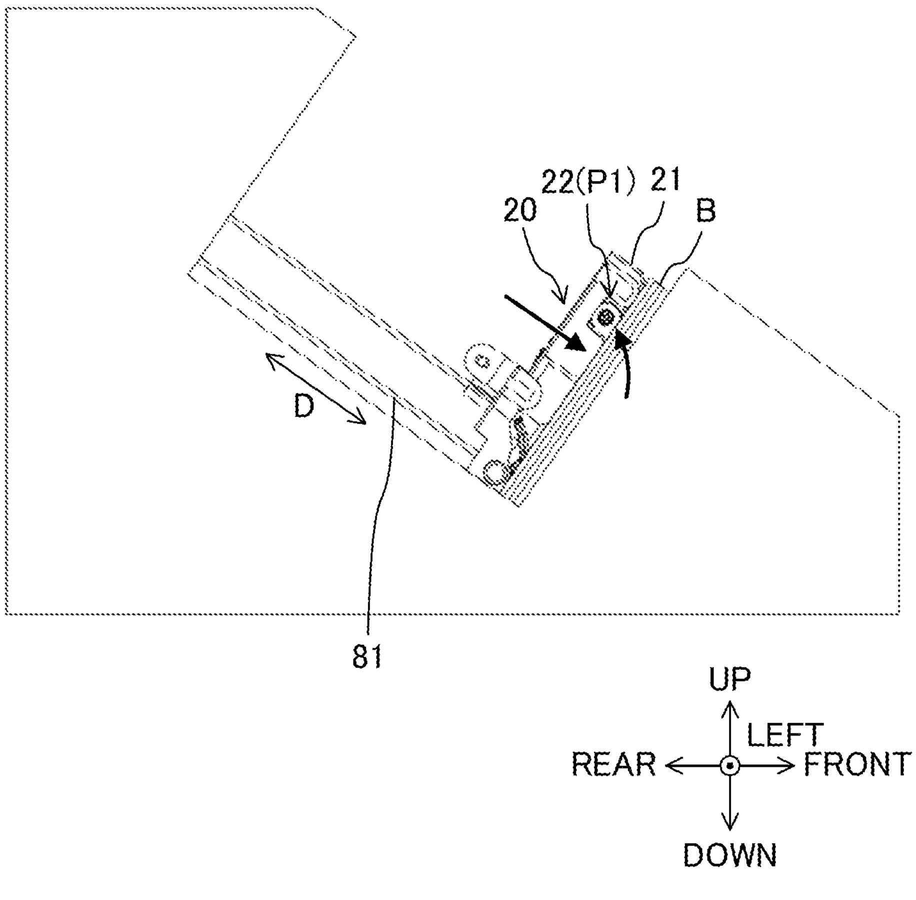
FIG. 11D is a left side view (4) illustrating the internal structure around the taking-out space for explaining the operation of the roof in the embodiment.
Figure 12D:
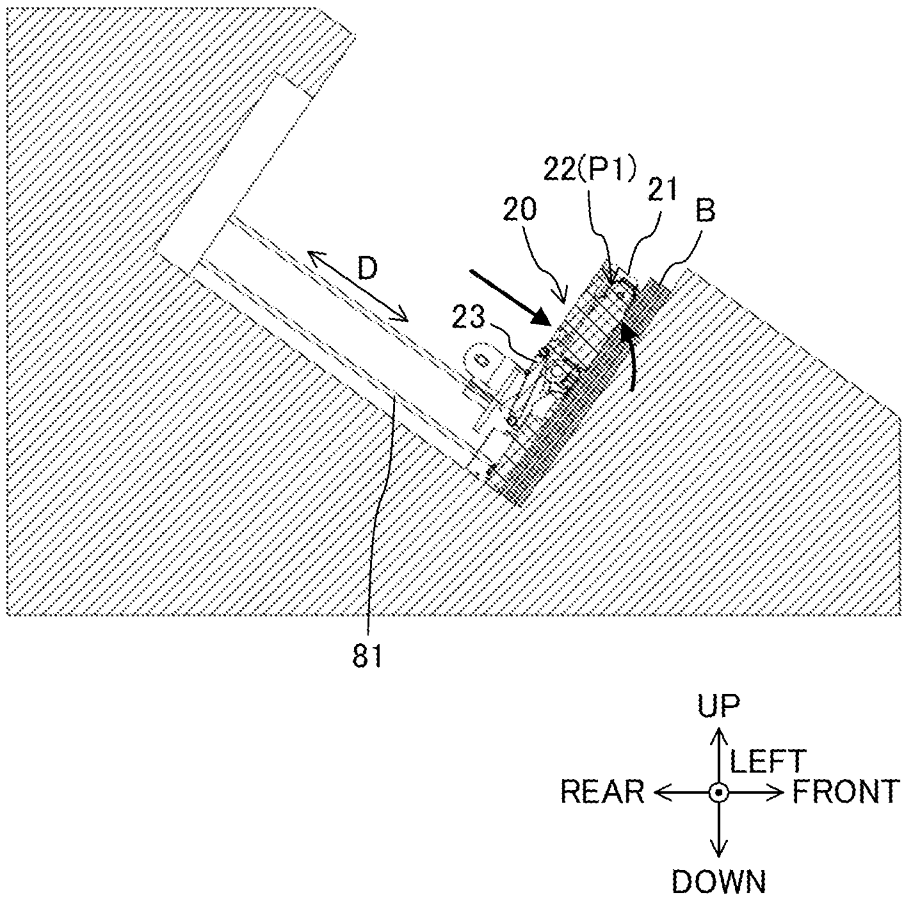
FIG. 12D is a cross-sectional view (4) illustrating the internal structure around the taking-out space for explaining the operation of the roof in the embodiment.

As illustrated in FIGS. 11D and 12D, when the customer forgets to take in the banknote B, the roof 20 may move to the taking-in and conveying unit 40 side together with the pusher 30 illustrated in FIG. 1 described above, and the taking-in and conveying unit 40 may take the banknote B sandwiched between the roof 20 and the pusher 30 into the automatic transaction apparatus 100.

Note that, in the present embodiment, the roof 20, which is an example of a movable unit, is disposed in the banknote deposit/withdrawal unit 1, but the roof 20 may be disposed in a money dispenser dedicated to withdrawal. In addition, the second lever 22*b*, the slider 22*c*, the roller 22*d*, the pusher 30, and the like may be omitted, and the configuration of the banknote deposit/withdrawal unit 1 is not particularly limited. In addition, the pressing unit 22 may move linearly instead of the rotational movement of the first lever 22*a* and the second lever 22*b*, or may abut on the banknote B at the distal end (for example, a roller) of the first lever 22*a* by the rotational movement of only the first lever 22*a*. In addition, in a case where the roller 22*d* is omitted, the contact portion of the pressing unit 22 with the banknote B is preferably formed of a low-friction member.

In the present embodiment described above, the automatic transaction apparatus 100, which is an example of a paper sheet handling apparatus, includes the roof 20, which is an example of a movable unit that changes the size of the taking-out space S by moving in the direction of approaching and retreating (approaching/retreating direction D) to the banknote B, which is an example of a paper sheet, discharged to the taking-out space S. The roof 20 includes the roof main body 21 which is an example of a movable unit main body, and the pressing unit 22 which is movable to the storage position P1 at which the pressing unit 22 is stored along the roof main body 21 and the pressing position P2 at which the pressing unit 22 presses the banknote B.

As a result, since the pressing unit 22 can press the banknote B in the taking-out space S, even if the shutter 70 of the insertion/taking-out port 61 illustrated in FIG. 1 is opened in a case where the automatic transaction apparatus 100 is particularly arranged outdoors, it is possible to prevent the banknote B to be withdrawn from being blown off from the taking-out space S by wind or the like. Furthermore, as compared with a comparative example in which the banknote B is protruded from the taking-out space S by a pair of conveying belts or the like that nips and conveys the banknote B, the pressing force of the pressing unit 22 arranged so as to be storable along the roof main body 21 can be weakened. Therefore, it is possible to facilitate the customer to remove the banknote B and to suppress the banknote B from being damaged. Therefore, according to the present embodiment, the banknote B (paper sheet) can be stabilized in the taking-out space S, and the banknote B (paper sheet) can be easily taken out from the taking-out space S.

In the present embodiment, the movable unit 20 further includes the tension spring 23, which is an example of a biasing member that biases the pressing unit 22 toward the pressing position P2. By using the tension spring 23 in this manner, the banknote B can be pressed regardless of the number of banknotes B in the taking-out space S. In addition, since the pressing unit 22 can be easily pushed back when the customer removes the banknote B, the customer can more easily remove the banknote B. Furthermore, since it is possible to press the banknote B by setting an appropriate biasing force, it is possible to suppress unexpected dropping of the banknote B when the customer removes the banknote B as compared with the configuration in which the banknote B is not pressed.

In addition, in the present embodiment, the pressing unit 22 is stored at the storage position P1 against the biasing force of the tension spring 23 in a state where the movable unit 20 is retreated, and moves toward the pressing position P2 by the biasing force of the tension spring 23 when the movable unit 20 starts to move in the direction approaching the banknote B (approaching/retreating direction D). As a result, the configuration of moving the pressing unit 22 to the storage position P1 at which the pressing unit 22 is stored along the roof main body 21 or the pressing position P2 at which the pressing unit 22 presses the banknote B can be realized with a simple configuration.

In addition, in the present embodiment, the pressing unit 22 includes the first lever 22*a* rotatably supported by the roof main body 21 on the first rotation shaft 21*a* and having the distal end stored outside the taking-out space S than the first rotation shaft 21*a* at the storage position P1, the second lever 22*b* rotatably supported by the roof main body 21 on the second rotation shaft 22*e* located on the inner side of the taking-out space S than the first rotation shaft 21*a* in the roof main body 21, and the slider 22*c* to which the distal end of the second lever 22*b* is fixed and which slides along the first lever 22*a*. As a result, the banknote B can be pressed by the simple and strong pressing unit 22 using the rotation of the first lever 22*a* and the second lever 22*b*.

In the present embodiment, the pressing unit 22 further includes the roller 22*d* that is rotatably fixed to the slider 22*c* and abuts on the banknote B. As a result, the customer can more easily remove the banknote B by the rotation of the roller 22*d*.

Note that the present invention is not limited to the above-mentioned embodiment as it is, and can be embodied by modifying components thereof. For example, various inventions can be formed by appropriately combining a plurality of components disclosed in the present embodiment. As described above, various modifications and applications of the invention can be made without departing from the gist of the invention.

The invention claimed is:

1. A paper sheet handling apparatus comprising a movable unit that changes a size of a taking-out space by moving in a direction of approaching a paper sheet discharged to the taking-out space and a direction of retreating the paper sheet,
- wherein the movable unit includes a movable unit main body and a pressing unit movable to a storage position where the pressing unit is stored along the movable unit main body, and a pressing position where the pressing unit presses the paper sheet, and
- the pressing unit includes a first lever that is rotatably supported by the movable unit main body on a first rotation shaft and has a distal end stored outside the taking-out space with respect to the first rotation shaft at the storage position, a second lever that is rotatably supported by the movable unit main body on a second rotation shaft located on an inner side of the taking-out space with respect to the first rotation shaft in the movable unit main body, and a slider to which a distal end of the second lever is fixed and which slides along the first lever.

2. The paper sheet handling apparatus according to claim 1, wherein the movable unit further includes an elastic body that biases the pressing unit toward the pressing position.

3. The paper sheet handling apparatus according to claim 2, wherein the pressing unit is stored in the storage position against a biasing force of the elastic body in a state where the movable unit is retreated, and moves toward the pressing position by the biasing force of the elastic body when the movable unit starts to move in a direction of approaching the paper sheet.

4. The paper sheet handling apparatus according to claim 1, wherein the pressing unit further includes a roller that is rotatably fixed to the slider and abuts on the paper sheet.

* * * * *